United States Patent
White

(10) Patent No.: US 7,406,467 B1
(45) Date of Patent: Jul. 29, 2008

(54) NETWORK-BASED MANAGEMENT OF AIRLINE CUSTOMER DATA

(75) Inventor: Shirley A. White, Minneapolis, MN (US)

(73) Assignee: Unisys Corporation, Blue Bell, PA (US)

(*) Notice: Subject to any disclaimer, the term of this patent is extended or adjusted under 35 U.S.C. 154(b) by 341 days.

(21) Appl. No.: 11/003,192

(22) Filed: Dec. 3, 2004

(51) Int. Cl.
  *G06F 7/00* (2006.01)
  *G06F 17/30* (2006.01)
  *G05B 19/418* (2006.01)
  *G06F 9/46* (2006.01)

(52) U.S. Cl. .......................... 707/4; 715/962; 715/963; 705/8; 705/9

(58) Field of Classification Search ................ None
See application file for complete search history.

(56) References Cited

U.S. PATENT DOCUMENTS

| | | | |
|---|---|---|---|
| 6,085,169 A * | 7/2000 | Walker et al. ................. 705/26 |
| 6,240,362 B1 | 5/2001 | Gaspard, II | |
| 6,353,794 B1 * | 3/2002 | Davis et al. ................. 701/201 |
| 6,385,537 B2 | 5/2002 | Gaspard, II | |
| 6,411,897 B1 | 6/2002 | Gaspard, II | |
| 2002/0178034 A1 * | 11/2002 | Gardner et al. ................. 705/5 |
| 2002/0194037 A1 * | 12/2002 | Creed et al. .................... 705/5 |
| 2003/0050865 A1 * | 3/2003 | Dutta et al. ................... 705/27 |
| 2003/0078914 A1 * | 4/2003 | Witbrock ........................ 707/3 |

* cited by examiner

*Primary Examiner*—Apu Mofiz
*Assistant Examiner*—Jared M Bibbee
(74) *Attorney, Agent, or Firm*—Charles A. Johnson; Robert Marley; Shumaker & Sieffert, PA

(57) ABSTRACT

A management system for a transportation carrier such as an airline is described that provides network-based management of customer data by allowing a user to form a list comprising multiple customers associated with different sets of criteria and to process customer data corresponding to customers associated with multiple lists defined by different criteria. In one embodiment, an airline management system allows a user to append additional customers to a list comprising previously selected customers without having to re-request the list with additional search criteria and re-select the previously selected customers. The airline management system also allows a user to simultaneously display multiple lists of customers that are defined by different criteria. As a result, airline personnel using the airline management system may more effectively and efficiently access and manage customer data required to provide airline services.

29 Claims, 10 Drawing Sheets

NETWORK-BASED MANAGEMENT OF AIRLINE CUSTOMER DATA

CROSS-REFERENCE TO RELATED APPLICATIONS

This application is generally related to co-pending U.S. patent application Ser. No. 11/003,913, entitled "Network Based Management of Airline Business Rules," filed Dec. 3, 2004, U.S. patent application Ser. No. 11/003,158, entitled "Network Based Management System Having Automated Flight Segment Linking," filed Dec. 3, 2004, U.S. patent application Ser. No. 11/003,154, entitled "Network Based Management of Airline Services for Customers with Special Needs," filed Dec. 3, 2004, U.S. patent application Ser. No. 11/003,691, entitled "Airline Management System Having Centralized Database Storing Airline Customer Data," filed Dec. 3, 2004, all of which are assigned to the assignee of the present application and incorporated herein by reference in their entirety.

TECHNICAL FIELD

The invention generally relates to airline management systems.

BACKGROUND

Airline management systems manage services provided by airlines and stations associated with those airlines. Exemplary services include registration and check-in services, interline services, flight handling, boarding services, baggage handling, passenger and baggage security, system administration, system interfaces and data reporting.

Airline employees interact with the airline management system to retrieve and view information about customers in order to provide the airline services. In general, searching for specific customers and displaying the information pertaining to the customers is a necessary preliminary step in providing many of the airline services. When searching for customers with specified attributes, an agent is often forced to view and work from a single list of customers in order to take action on the customers.

Moreover, in many situations, a complete list of the customers in which the agent is interested is not always displayed. For example, once the customer presents herself to the agent and requests services, the agent invokes a search function provided by the airline management system to locate the information pertaining to the customer. The agent then identifies the customer from the search results, and is often forced to navigate to an appropriate screen to display additional information about the customer to provide the requested airline services to the customer.

SUMMARY

In general, the invention is directed to a computer environment in which a management system for a transportation carrier such as an airline provides network-based management of customer data needed to provide airline services. Unlike prior art systems that have no way of appending customers that satisfy a set of search criteria to a list of customers satisfying a different set of search criteria, the airline management system allows an authorized user, such as an airline employee, to form a list that aggregates customer data that satisfies different sets of search criteria. In other words, the user is not limited to defining a single set of criteria when producing the list of customers. Multiple sets of criteria may be defined, and the results may be aggregated to form a composite list. For example, the user may request a list of customers satisfying certain search criteria and select customers from the list. The user may then input different search criteria and request the list of customers satisfying the different search criteria. The list of customers satisfying the different search criteria may also include the previously selected customers satisfying the first search criteria. The user may specify search criteria comprising a surname of a customer, a credit card number, a frequent flyer number, an airline, a flight number, a boarding number, a seat number, a standby number, a passport number, a confirmation number, and any other such unique customer attributes or combination thereof. The user may repeat this process until all desired customers are selected.

Further, the airline management system allows the user to easily view and process customer data corresponding to customers associated with multiple lists defined by different search criteria. For example, airline management system may display two or more lists simultaneously, e.g. side-by-side, and allow the user to select customers from any of the lists for processing. Thus, the user may more effectively and efficiently access and manage customer data required to provide airline services. The lists that may be displayed simultaneously may include any combination of a standby passenger list, a passenger grading list, a need notification list, a volunteer list, a passenger available for disembarkation (PAD) list, a not boarded list, an inbound summary list, a registered customers list, an inbound flight summary list, and any other pre-defined list.

In one embodiment, a method comprises presenting a network user interface to receive a first set of search criteria, and searching a database to identify a first set of one or more customers that satisfy the first set of search criteria. The database stores customer data associated with customers of one or more airlines. The method further comprises generating an intermediate list comprising the identified the first set of customers, presenting the network user interface to receive a second set of search criteria different than the first set of search criteria, searching the database to identify a second set of one or more customers that satisfy the second set of search criteria, forming a composite list from the first set of customers and the second set of customers, and displaying the composite list via the network user interface.

In another embodiment, an airline management system comprises a host computer that stores customer data associated with customers of one or more airlines, and a computer (e.g., a web server) coupled to the host computer system. A user interface software module operating on the computer presents a user interface for receiving a first set of search criteria and a second set of search criteria different than the first set of search criteria. A list management module executing on the host computer system accesses the database in accordance with the first search criteria to form an intermediate list identifying a first set of one or more customers that satisfy the first set of search criteria. The list management module accesses the database in accordance with a second set of search criteria to form a composite list that includes a second set of one or more customers that satisfy the second set of search criteria and at least a portion of the intermediate list identifying the first set of customers.

In another embodiment, a method comprises presenting a network user interface for receiving input from a user, wherein the input specifies two or more search criteria associated with customer data. The method further comprises searching a database to identify one or more customers in accordance with each of the search criteria, wherein the database stores customer data associated with services provided by one or more airlines. The method includes generating a plurality of customer lists comprising the customer data, wherein each of the customer lists corresponds to different search criteria, and displaying each list simultaneously via the network user interface.

In another embodiment an airline management system comprises a host computer system that stores customer data associated with services provided by one or more airlines, and a computer coupled to the host computer system. A user interface software module operating on the host computer system presents a user interface for receiving two or more search criteria associated with the customer data and simultaneously displaying a list associated with each of the search criteria. A list management module executing on the host computer system accesses the database to identify a respective set of one or more customers for each of the search criteria, and generates a corresponding list for each of the sets of customers.

In another embodiment an airline management system comprises means for presenting a network user interface to receive a first set of search criteria and a second set of search criteria, and means for searching a database to identify a first set of one or more customers that satisfy the first set of search criteria and a second set of one or more customers that satisfy the second set of search criteria. The airline management system further comprises means for forming a composite list from the first set of customers and the second set of customers, and means for displaying the composite list via the network user interface.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 9 is a screen illustration of an exemplary user interface for processing customer data corresponding to customers associated with a need notification list and a passenger available for disembarkation (PAD) list.

FIG. 10 is a screen illustration of an exemplary user interface for processing customer data corresponding to customers associated with a volunteer list and a not boarded list.

DETAILED DESCRIPTION

Figure 1:
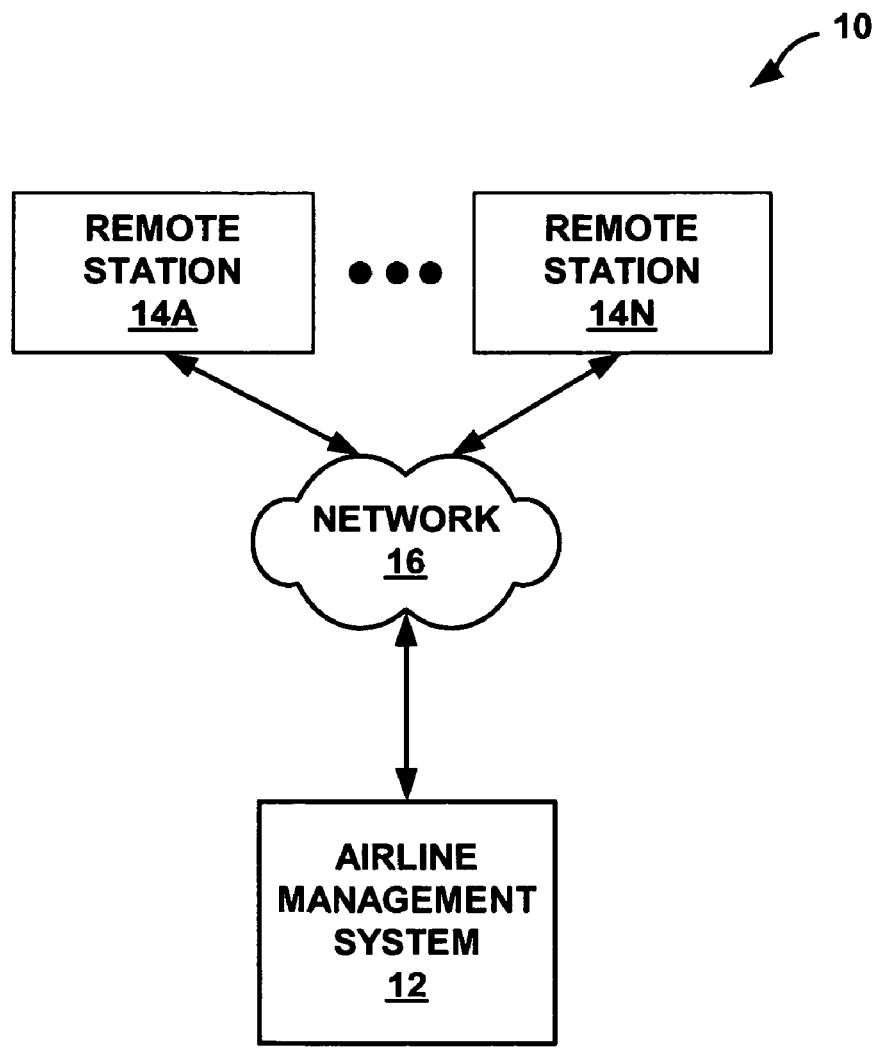
FIG. 1 is a block diagram illustrating an exemplary computing environment in which airline management system provides network-based management of customer data.

FIG. 1 is a block diagram illustrating an exemplary network based environment 10 in which airline management system 12 provides network-based management of customer data needed to provide airline services. Although this exemplary embodiment is described below as being adapted for use by an airline, it will be understood that the system and method discussed in the following paragraphs may be adapted for use with any transportation carrier. As one example of the advantages of the current embodiment, airline management system 12 allows an authorized user, such as an airline employee, to form a list of customer data that satisfies different sets of search criteria. Further, the airline management system allows the user to easily view and process customer data corresponding to customers associated with multiple lists defined by different search criteria. Thus, the user may more effectively and efficiently access and manage customer data required to provide airline services.

As described in detail herein, airline management system 12 provides a user interface with which authorized users residing at remote stations 14A-14N ("remote stations 14") interact to perform a number of tasks associated with managing customer data. A user may be, for example, a gate agent, a flight supervisor, an off airport registration provider, a customer performing self-registration, and any other user responsible for customer data and registration services. Remote stations 14 may be associated with a single airline or different airlines. In other words, airline management system 12 may provide network-based airline management service for multiple airline carriers.

When managing customer data and performing customer services, the user may interact with airline management system 12 to formulate one or more customer lists based on criteria. Exemplary criteria includes a surname of a customer, a credit card number, a frequent flyer number, an airline, a flight number, a boarding number, a seat number, a standby number, a passport number, a confirmation number, and any other such unique customer attributes or combination thereof. Airline management system 12 may display multiple lists, such as a standby passenger list, a passenger grading list, a need notification list, a volunteer list, a passenger available for disembarkation (PAD) list, a not boarded list, an inbound summary list, a registered customers list, an inbound flight details list, or any combination thereof.

In addition, airline management system 12 may manage other aspects of an airlines business, such as reservation and check-in functions. The reservation and check-in functions may, for example, include customer handling (agent assisted and self-service), electronic ticketing, interline services (through check and electronic ticket), flight handling (for check-in), boarding services, baggage handling, passenger and baggage security, system administration, system interfaces, and data reporting.

Airline management system 12 may present the user interface as a graphical set of interrelated screens. The user interface presents the interrelated screens in a manner that allows the user to manage customer data and formulate lists of customers. For example, the user may aggregate search results to form a composite list. Specifically, a user residing at one of remote stations 14 may append customers that satisfy search criteria to a list of previously selected customers that satisfy different search criteria. In another example, a user residing at one of remote stations 14 may display multiple lists in a single screen, where each list identifies customers satisfying different criteria. As described, the user may interact with any of the simultaneously displayed lists to manage the customer data.

Each of the users associated with remote stations 14 typically access airline management system 12 via a network 16 using a remote computing device having suitable communication software, e.g., a web browser. A user may access airline management system 12 using a network-enabled computing device, such as a workstation, personal computer, laptop computer or a handheld device. The communication device executes the communication software in order to communicate with airline management system 12.

Remote stations 14 may include remote stations located in a single airport or, more likely, remote stations located in multiple airports. In addition, one or more remote stations 14 may be located outside of the airport environment. For example, one or more remote stations may be located within hotels, travel agencies or other locations. In another example, a user may remotely access airline management system 12 from a computing device located within his home.

Network 16 be any private or public network, and may include one or more Local Area Networks (LANs), Wide Area Network (WANs), Wireless LANs or the like. Network 16 may also include one or more connected network devices (not shown), such as personal computers, laptop computers, handheld computers, workstations, servers, routers, switches, printers, fax machines or other devices.

Figure 2:
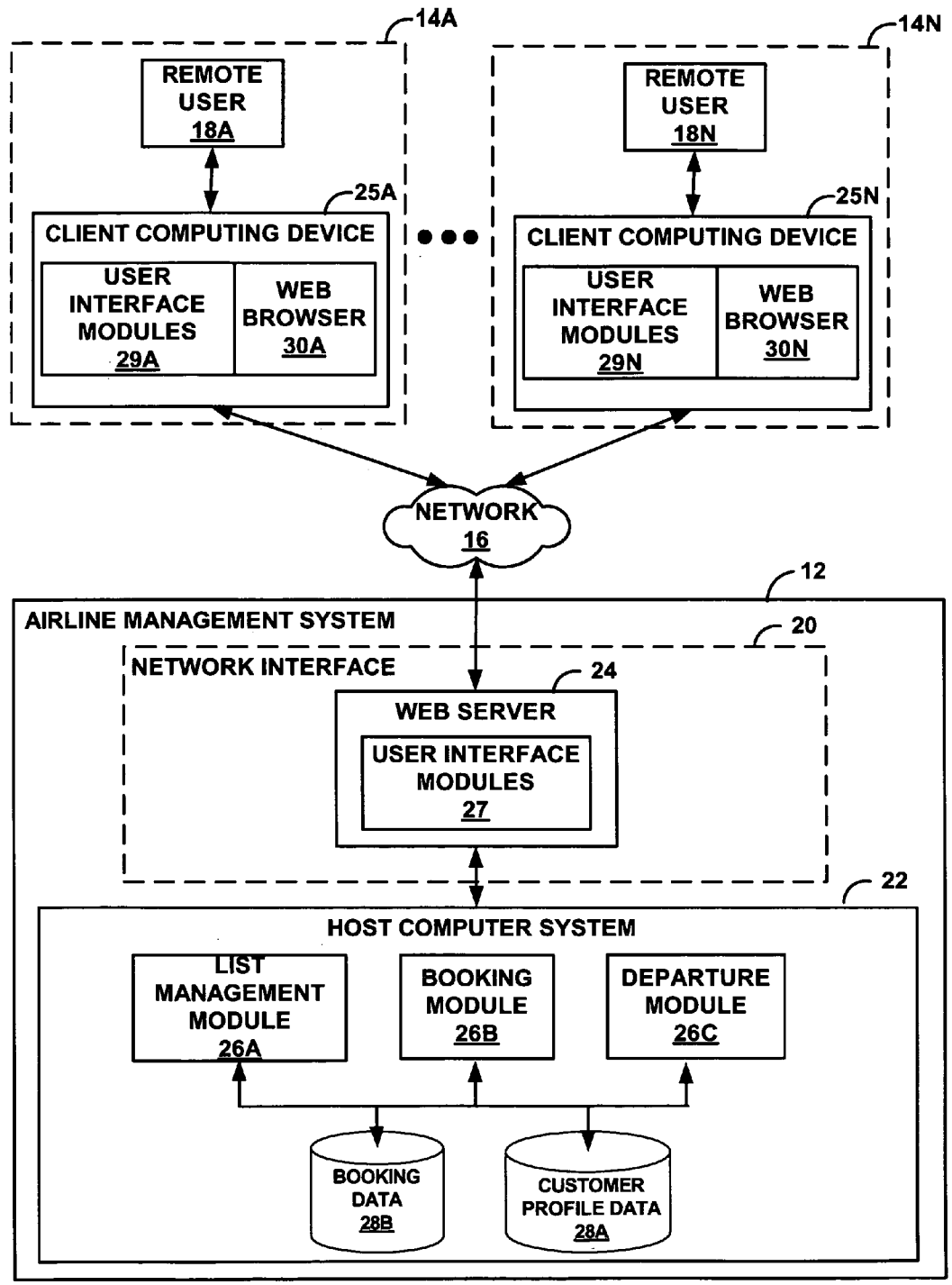
FIG. 2 is a block diagram illustrating an exemplary embodiment of an airline management system in further detail.

FIG. 2 is a block diagram illustrating an exemplary embodiment of airline management system 12 in further detail. In the exemplary embodiment, airline management system 12 includes a host computer system 22 coupled to network 16 via a network interface 20. In general, host computer system 22 provides a computing platform for hosting airline management services for airline carriers. In particular, host computer system 22 hosts airline management system 12 to provide network-based management of customer data by allowing a user to form a list comprising multiple customers associated with different sets of criteria and to process customer data corresponding to customers associated with multiple lists defined by different criteria. Host computer system 22 may comprise, for example, a single Unisys 2200 series mainframe executing airline services management software.

Host computer system 22 executes a number of software modules 26 to assist in providing airline services. In this example, host computer system 22 comprises a list management module 26A, a booking module 26B and a departure module 26C.

Remote users 18A-18N ("remote users 18") interact with list management module 26A to manage customer data maintained by airline management system 12. As will be described in detail, list management module 26A allows remote users 18 to form a list comprising customers that satisfy a set of search criteria, and append additional customers to the list of previously selected customers by iteratively requesting additional lists identifying customers that satisfy different sets of search criteria. In this manner, remote users 18 can intelligently build composite or aggregate lists of customers.

The search criteria used to form a list may include a surname of a customer, a credit card number, a frequent flyer number, an airline, a flight number, a boarding number, a seat number, a standby number, a passport number, a confirmation number, and any other such customer or airline attribute or combination thereof. Thus, when a user, such as user 18A, requests a list of customers and the list does not include all customers that the user desires, the user is not required to re-request the list with additional search criteria and re-select the customers included in the previous list. Consequently, users 18 may more effectively and efficiently manage customer data required to provide airline services, such as reservation and check-in services. The airline services may include reservation and check-in services performed at an airport gate or other location, such as accepting a customer from a standby list, upgrading a customer, notify a customer regarding changes made to the customer's data, or other service.

Furthermore, list management module 26A also allows remote users 18 to simultaneously display multiple lists identifying customers corresponding to different sets of criteria and interactively process customer data corresponding to a customer associated with the lists. In other words, a user may change customer data corresponding to a customer in one of the displayed lists and list management module 26A causes a corresponding change in dependent or related lists. Multiple lists may be displayed at the same time (i.e., simultaneously) by presenting a split-screen user interface that enables a user to display and manage customer data associated with the lists. The lists may include a standby list, a grading list, a need notification list, a volunteer list, a passenger available for disembarkation (PAD) list, a not boarded list, an inbound summary list, a registered customers list, an inbound flight details list or any other list identifying one or more customers or groups of customers.

Booking module 26B manages booking data associated with airline flights and stores the data in booking data 28B. Booking data 28B stores information including passenger names, the number of segments in a journey, the routes with the flight number, and any special needs and requirements, such as special meals, wheelchairs, and the like that may be needed by the passengers.

Departure module 26C manages the check-in process on the day of departure, including the check-in of both passengers and baggage. For example, remote user 18A may interact with departure module 26C to provide seat assignments, handle the issuance of boarding passes and bag tags, manage standby passengers, upgrade passengers, and handle passenger notifications.

Although illustrated as a separate module, list management module 26A manages customer data maintained by departure module 26B. For example, users 18 may interact with list management module 26A in order to perform services provided by departure module 26C by forming a list comprising customers that satisfy a set of search criteria and appending additional customers to the list of previously selected customers that satisfy a different set of search criteria. In another example, users 18 may interact with list management module 26A to simultaneously display multiple lists identifying customers corresponding to different sets of criteria and interactively process customer data corresponding to a customer associated with the lists in order to provide departure services associated with departure module 26C.

In one embodiment, airline management system 12 allows remote users 18 to interact with the DEPART module of AirCore that is commercially available from Unisys Corporation to form a list comprising customers that satisfy a set of search criteria and append additional customers to the list of previously selected customers that satisfy a different set of search criteria. In another embodiment, airline management system 12 allows users 18 to interact with the DPART module of AirCore that is commercially available from Unisys Corporation to simultaneously display multiple lists identifying customers corresponding to different sets of criteria and interactively process customer data corresponding to a customer associated with the lists.

Airline management system 12 maintains customer profile data 28A, which is accessible by modules 26A-26C. Customer profile data 28A stores information for each airline customer, such as customer preferences regarding seat assignments, meals, preferred connection points, connection points that are to be avoided, a preferred maximum number of flight connections per journey, hotel and vehicle preferences, preferred methods of payment or other customer information. Customer profile data 28A may further store contact information, including the preferred modes of communication, and information regarding loyalty programs in which the customer participates (e.g., frequent flier plans), and special customer needs and requirements, such as handicap needs, whether the traveler is a child or an unaccompanied minor or other needs.

Network interface 20 comprises one or more computing services, e.g., web server 24, to provide a seamless, network-based interface by which remote users 18A-18N access host computer system 22. Although host computer system 22 and web server 24 are illustrated separately in FIG. 2 for exemplary purposes, airline management system 12 may be realized by a single computing device or a plurality of cooperating computing devices.

Web server 24 provides a web-based interface by which authorized users 18A communicate with airline management system 12 via network 16. In one configuration, web server 24 executes web server software, such as software marketed by Microsoft Corporation under the trade designation "INTERNET INFORMATION SERVER." As such, web server 24 provides an environment for interacting with remote users 18 via user interface modules 27. As described in detail below, user interface modules 27 provide an interface that allows users 18A-18N to manage customer data required to provide airline services. User interface modules 27 may include Active Server Pages, web pages written in hypertext markup language (HTML) or dynamic HTML, Active X modules, Java scripts, Java Applets, Distributed Component Object Modules (DCOM), and the like. User interface modules 27 may execute within an operating environment provided by web server 24. Alternatively, portions of user interface modules 27 may be downloaded as "client-side" user interface modules 29A-29N ("client-side user interface modules 29") that are executed on client computing devices 25A-25N, respectively. Client-side user interface modules 29 could, for example, include Active X components or Java scripts executed by web browsers 30A-30N executing on client computing devices 25A-25N respectively.

As will be described in detail, user interface modules 27 interact with host computer system 22 to allow remote users 18 to manage customer data that an airline needs to provide airline services. User interface modules 27 may generate an exemplary user interface with which a remote user may interact to perform a number of tasks associated with managing customer data. In addition, user interface modules 27 may generate exemplary user interfaces to manage other aspects of an airlines business, such as reservation and check-in functions including, for example, customer handling, electronic ticketing, interline services, flight handling, boarding services, special services, baggage handling, passenger and baggage security, system administration, system interfaces and data reporting.

In particular, user interface modules 27 may present a user interface to remote user 18A, for example, as a graphical set of interrelated screens for appending additional customers to a list comprising previously selected customers without having to re-request the list with additional search criteria and re-select the previously selected customers. For example, user interface 27 may present an initial user interface for inputting search criteria and a subsequent user interface for displaying a list of customers that satisfy the search criteria. The search criteria that airline management system 12 receives from remote user 18A may include the surname of a customer, a credit card number, a frequent flyer number, an airline, a flight number, a boarding number, a seat number, a standby number, a passport number, a confirmation number, and any other such unique customer attributes or combination thereof.

Based on the search criteria, list management module 26A accesses customer profile data 28A, booking data 28B, or both and identifies customers that satisfy the search criteria. User 18A may optionally select customers from the list and append additional customers to the selected customers. Upon receiving an indication from user 18A to append additional customers to the previously selected customers, user interface modules 27 may again present the initial user interface for inputting search criteria. User 18A may then input a different set of search criteria.

Based on the input search criteria, list management module 26A again accesses customer profile data 28A, booking data 28B, or both, and identifies customers that satisfy the input search criteria. In response to receiving the different search criteria, user interface modules 27 may present the subsequent user interface and display the previously selected customers as well as the customers that satisfy the different set of search criteria. In the event that the list does not include all the customers which user 18A desires to manage the customer data of, user 18A may iteratively append additional customers to the previously selected customers until the list includes all desired customers. In this manner, user 18A may iteratively form a composite list of customers matching different search criteria.

User 18A may then manage the customer data corresponding to customers associated with the composite list of customers. For example, user 18A may interact with airline management system 12 to manage access and update customer profile data 28A or booking data 28B. In this manner, user 18A may more effectively and efficiently manage customer data required to provide airline services.

Furthermore, user interface modules 27 may present a user interface to remote user 18A for simultaneously displaying multiple lists comprising customers corresponding to different sets of criteria. By way of the user interface, user 18A may interactively update the customer data corresponding to customers associated with the lists.

For example, user interface modules 27 may present a split-screen user interface displaying two lists comprising customers associated with different criteria. Some lists may be used independently while other lists may be used together to allow user 18 to process customer data in each list interactively. Any customer list may be selected and displayed from either side of the split-screen user interface, however, each side of the split-screen user interface comprises different fields appropriate for the specified lists. The fields may be used to process customer data corresponding to a customer associated with the appropriate list.

In any event, the split-screen user interface receives input for specifying search criteria used in forming each list to be displayed. Based on the input, list management module 26A accesses customer profile data 28A, booking data 28B, or both, and displays the appropriate lists. Airline management system 12 then receives input for managing customer data associated with one of the lists displayed via the split-screen user interface.

Based on the input, list management module 26A interactively processes customer data corresponding to customers associated with the list. In other words, list management module 26A may accesses customer profile data 28A or booking data 28B and change the stored data in accordance with input received from user 18. List management module 26A may then correspondingly change the appropriate customer data associated with any dependent or related lists currently displayed. In this manner, a modification to customer data associated with a customer corresponding to a particular list may automatically result in a corresponding change to customer data in dependent or related customer lists previously formulated and displayed.

As one example, user interface modules 27 may present a split-screen user interface displaying a standby list of customers for a flight on one side and a list of customers registered for the flight on the other side of the split-screen user interface. User 18A may then provide input for placing a customer associated with the registered customer list on standby. Upon receiving the input, linking module 26A accesses booking data 28B and changes the appropriate customer data to indicate that the customer is on standby for the flight. Furthermore, linking module 26A also updates the standby list and the registered customer list by including and removing the customer, respectively. Thus, user 18A may more effectively and efficiently manage customer data required to provide airline services, in particular airline services provided at a gate of an airport.

In this manner, users 18 may interact with a number of user interfaces presented by user interface modules 27, as described herein, to manage customer data and provide management of airline services.

Figure 3:
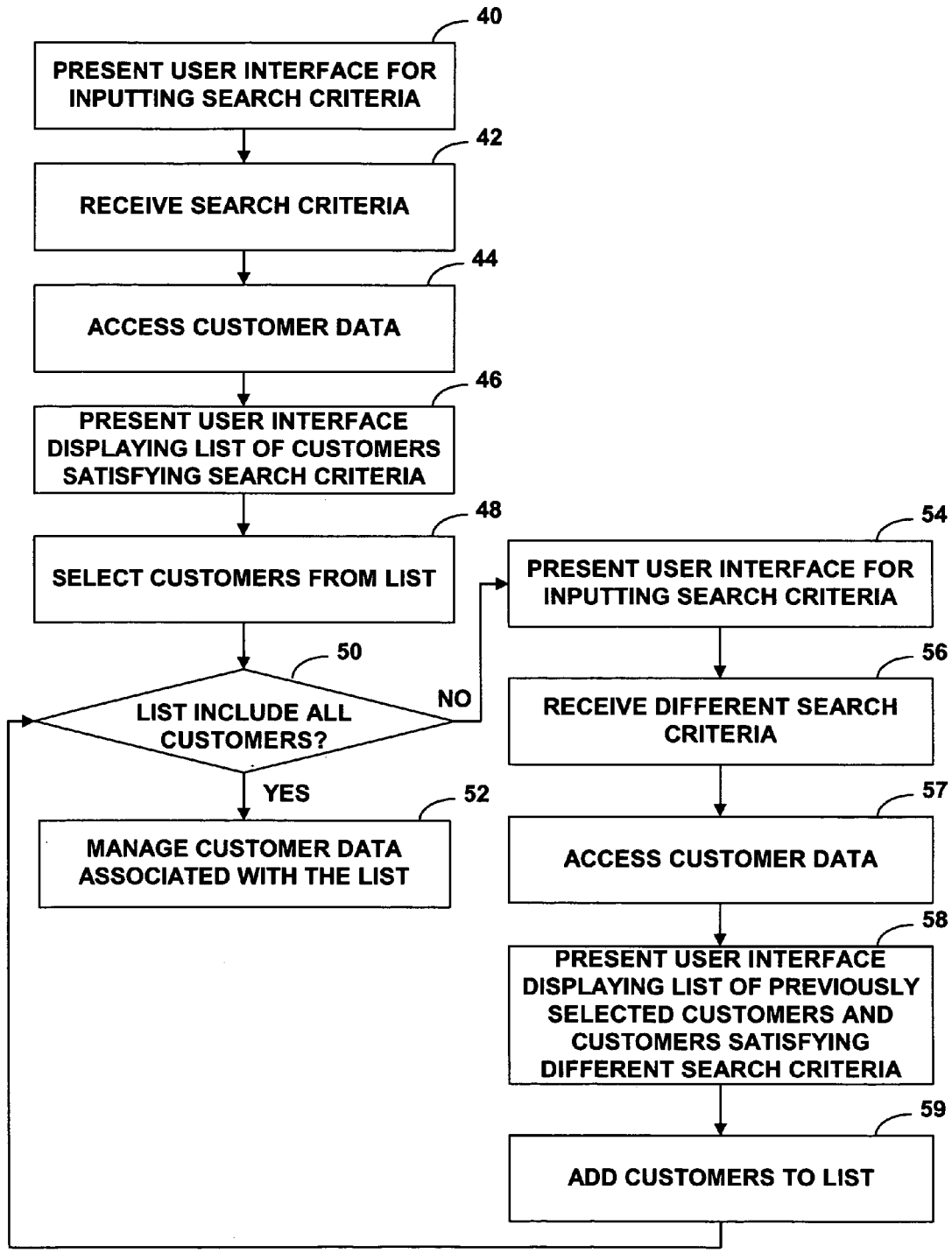
FIG. 3 is a flow diagram illustrating exemplary operation of an airline management system providing network-based management of customer data.

FIG. 3 is a flow diagram illustrating exemplary operation of airline management system 12. Initially, a user, such as a gate agent or a flight supervisor, logs into airline management system 12. User 18 may, for example, connect to airline management system 12 using a web browser, and input a username and password to log into airline management system 12.

Airline management system 12 presents user 18A with a user interface for inputting search criteria to generate a list of customers (40). The search criteria may include, for example, a surname, a form of identification such as a credit card number or a frequent flyer number, or a combination thereof. In some embodiments, flight information is also required when the search criteria only includes a surname. In other embodiments, the search criteria may also include additional attributes, such as a seat number, a checked baggage tag number, a ticket number, a confirmation number, boarding number, a standby number, a passport number, a national identification card number, a driver's license number, a telephone number or any combination thereof. In any event, airline management system 12 receives input from the user identifying the search criteria (42).

Airline management system 12 accesses customer profile data 28A, booking data 28B, or both (44), and presents a user interface displaying a list of customers satisfying the search criteria (46). For each customer, the user interface may display all or a portion of the customer data maintained by customer profile data 28A and booking data 28B in this example. Example data that may be displayed includes the full customer name, full itinerary of the customer for the journey including the current flight, the frequent flyer number, program tier, mileage balance, registered preferences, a form of identification (FOID), ticket number, booking system confirmation number, seat number, booking class, status, travel code, employment date and priority, special services required, documentation information, contact information, group identification code, standby number, notification messages, baggage information, boarding number, system-assigned registration party identifier, targeted marketing messages, personal messages, disservice indicator, communication preferences, and any other information associated with the customer and stored in customer profile data 28A or booking data 28B.

For example, in the event that a user inputs only the first two letters of a surname and a flight number, airline management system 12 may generate a list identifying customers and related customer data for customers having a surname that match the search criteria. In another example, a customer that satisfies the search criteria may be a member of a registration party or booking party. In that case, the list may display all members of the registration or booking party. The user selects one or more customers (or registration parties) from the list (48). As described below, the list may be viewed as an intermediate list to which additional customers may be added to form a composite list.

When the list of selected customers does not include one or more particular customers the user sought to identify on the initial search (50), user interface modules 27 again presents the user interface for inputting search criteria (54). In response to receiving different search criteria (56), airline management system 12 again accesses customer profile data 28A, booking data 28B, or both (57), and presents the user interface displaying the previously selected customers as well as any customers satisfying the different search criteria (58).

The user may add newly identified customers that satisfy the different search criteria to the previously formed list by selecting the appropriate customers (59). In the event that the list still does not include all customers that the user sought to identify, the user can append additional customers to the list of previously selected customers by specifying different search criteria and repeating the process (54-59).

Once the list includes all the customers that the user wishes to include, the user manages the customer data corresponding to customers associated with the list (52). For example, the user may select one or more of the customers associated with the list and perform a service provided by the airline, such as register the customer or customers for a flight, upgrade the customer, change the customer's seat or perform any other function for one or more of the listed customers. Alternatively, the user may select a customer from the list and display the selected customer's history. The history of a customer may include one or more entries each indicating an action performed by airline management system 12 that affects the customer data, the specific action that was taken, where the action was taken, who performed the action, and when the action was performed.

Figure 4:
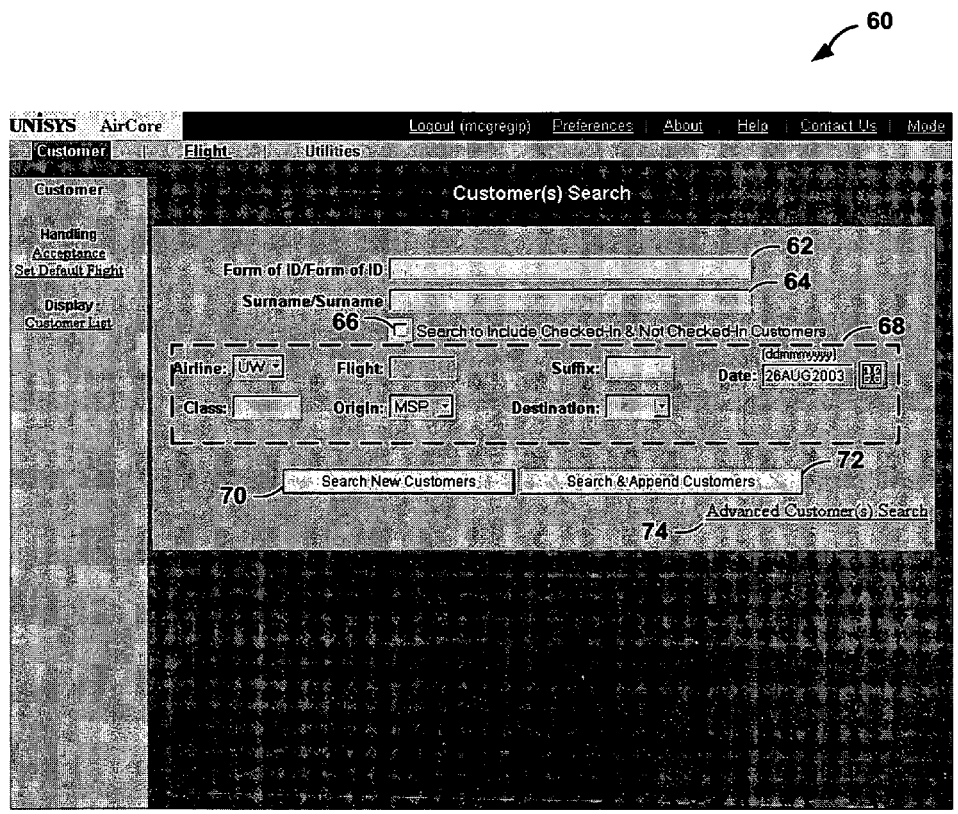
FIG. 4 is a screen illustration of an exemplary user interface for inputting search criteria for forming a list.

FIG. 4 is a screen illustration of an exemplary user interface 60 for inputting search criteria for generating a list of customers. As illustrated in FIG. 4, user interface 60 includes input fields 62, 64 for inputting a form of identification (FOID) and a surname, respectively. FOID input field 62 allows the user to input, for example, a credit card number or a frequent flyer number. The user may input two or more alpha characters as search criteria in surname input field 64. User interface 60 also includes a check box 66 for specifying the registration status of customers to be searched. When check box 66 is not activated, airline management system 12 searches only customers that have not been checked-in and searches both customers that have and customers that have not checked-in when check box 66 is activated.

In addition to input fields 62, 64 and check box 66, user interface 60 includes an input area 68 for identifying flight information search criteria. Input area 68 includes a number of boxes including input fields and drop-down menus for inputting flight information. The user inputs appropriate information into one or more of the boxes in input area 68. The more information the user inputs into input area 68, the narrower the search performed by airline management system 12. The user may, for example, input an airline, a flight number, a suffix, a date, a class, an origin, and a destination. Some of the boxes of input area 68 may be pre-filled with default information. For example, the date and origin boxes may be required for all searches and may be pre-filled with the current date and the location of the user. Other searches may require flight identification information. In the example illustrated in FIG. 4, the user specified airline UW at the MSP airport with a date of 26 Aug. 2003.

The user may choose to either search for customers that satisfy the specified search criteria, append customers that satisfy the specified search criteria to a list of previously selected customers, or input more detailed search criteria. The user may choose to either generate a list of new customers by activating the button 70 or append customers that satisfy the specified search criteria to a list of previously selected customers by activating button 72. In the event that the user desires to input detailed search criteria, the user may activate the advanced customer search link 74 and a user interface for inputting detailed search criteria is presented to the user.

Figure 5:
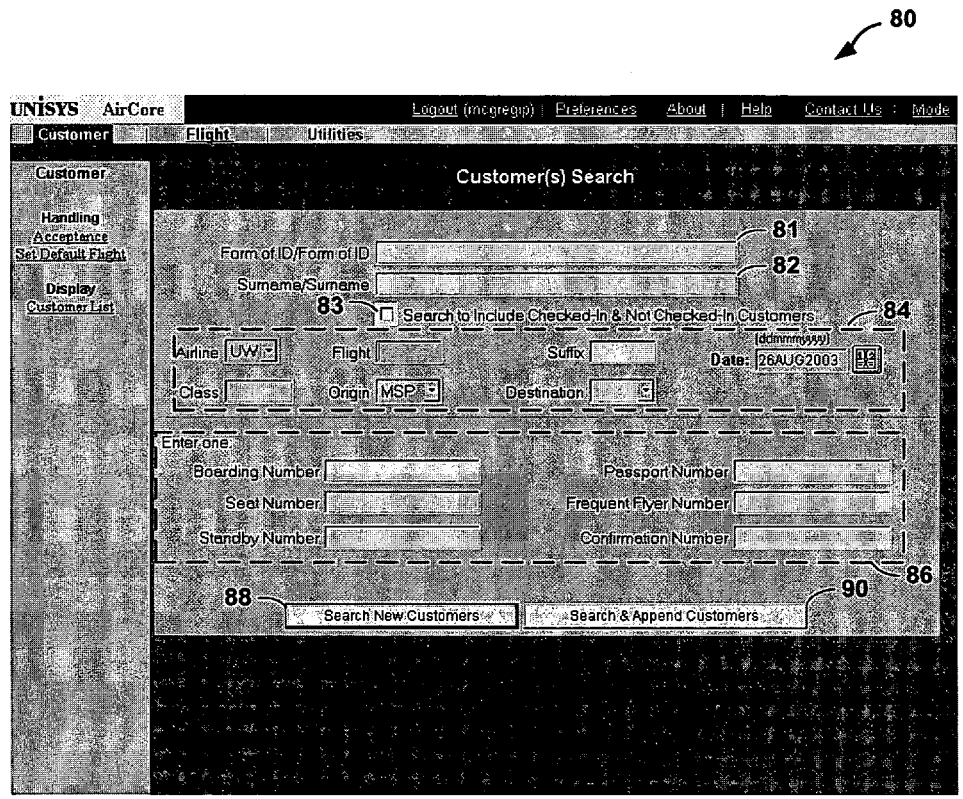
FIG. 5 is a screen illustration of an exemplary user interface for inputting detailed search criteria for forming a list.

FIG. 5 is a screen illustration of an exemplary user interface 80 for inputting detailed search criteria for generating a list of customers. Similar to user interface 60 (FIG. 4), user interface 80 provides boxes for inputting a FOID 81, a surname 82, and flight information 84. User interface 80 also includes a check box 83 for specifying the registration status of customers to be searched.

In addition to boxes 81-84, user interface 80 also includes an input area 86 for identifying detailed search criteria. Input area 86 includes a number of boxes for inputting detailed search criteria. The user inputs information into one of the boxes in input area 86. The user may, for example, input a boarding number, a seat number, a standby number, a passport number, a frequency flyer number, a confirmation number.

The user may choose to either generate a list of new customers by activating button 88 or append customers that satisfy the specified search criteria to a list of previously selected customers by activating button 90.

Figure 6:
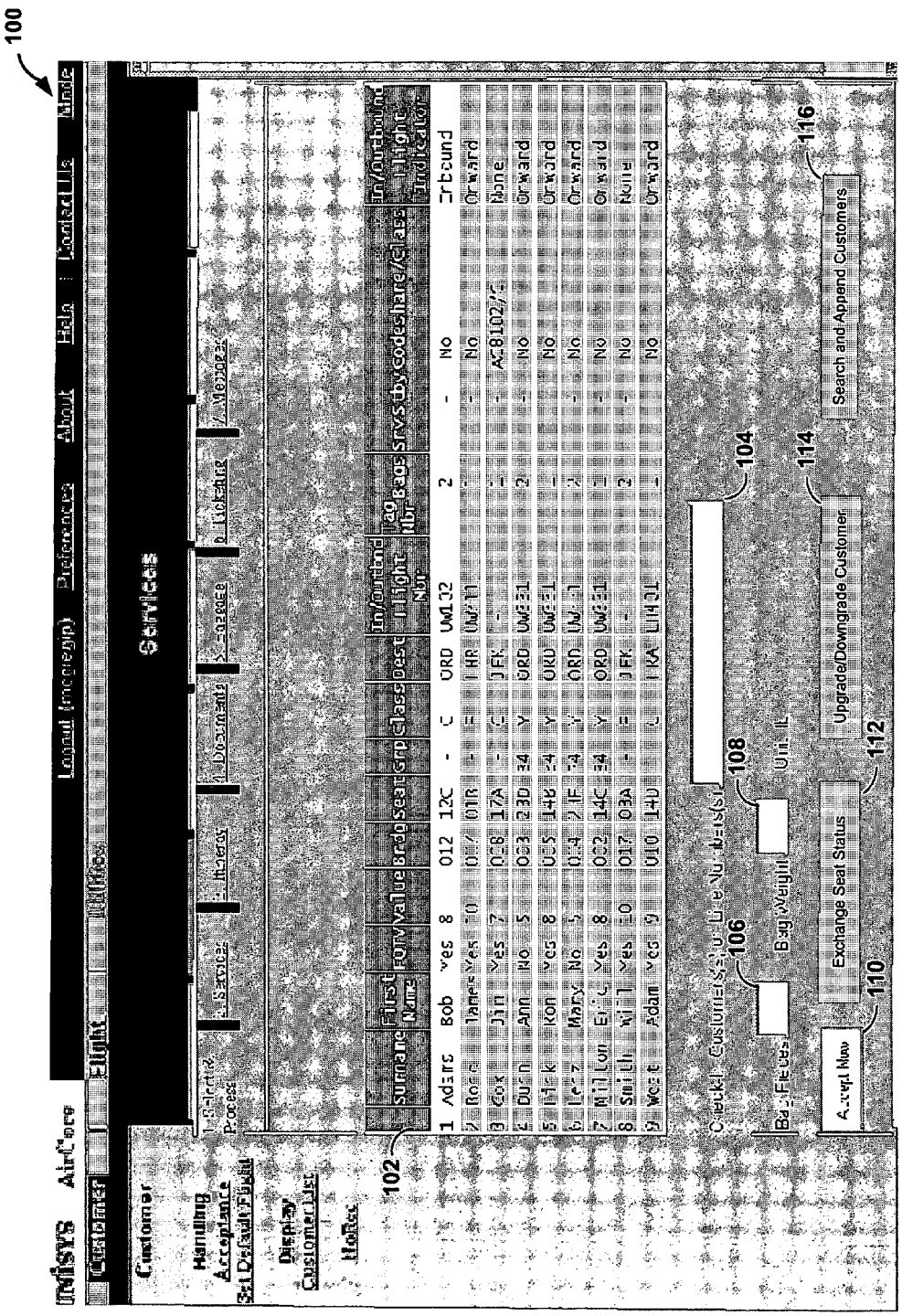
FIG. 6 is a screen illustration of an exemplary user interface for presenting a user with a list of customers satisfying the search criteria specified in the user interface illustrated in FIG. 4 or FIG. 5.

FIG. 6 is a screen illustration of an exemplary user interface 100 for presenting a user with a list of customers satisfying the search criteria specified in either user interface 60 (FIG. 4) or user interface 80 (FIG. 5). User interface 100 presents a list of customers that satisfy the search criteria and the customer data associated with each customer 102. In the example illustrated in FIG. 6, the search resulted in nine customers satisfying the search criteria. In this example, user interface 100 presents for each of the listed customers their associated customer data including frequent traveler status, customer value, boarding number, seat number, any group to which the customer belongs, class, destination, inbound or outbound flight number, bag tag number, number of bags, special services required, standby status, code share flight and class, and inbound or outbound flight indicator.

The user may choose to check-in customers, exchange the seat status of customers, upgrade or downgrade customers, or search and append additional customers to the list of customers 102. The user may choose to either check-in, exchange the seat status, and upgrade or downgrade one or more of the nine customers by inputting the line number corresponding to the desired customer in box 104 and activating the appropriate one of the accept now button 110, exchange seat status button 112 or upgrade/downgrade customer button 114. If accepting the customer, the user may additionally specify the number of bags and the total weight of the bags for a customer by inputting the appropriate information in boxes 106, 108 and subsequently activating the button 110.

In the event that the user desires to append additional customers to list 102, the user may initially select one or more customers from list 102. The user may select one or more customers from list 102 using a point-and-click device, such as a mouse or, alternatively, by entering the line numbers corresponding to the desired customers in box 104. Upon selecting the desired customers from list 102, the user activates search and append customers button 116 to initiate a new search. In response to the user activating the search and append customers button 116, the user is presented with a user interface, such as user interface 60 (FIG. 4) or user interface 80 (FIG. 5), for inputting different search criteria. Additionally, airline management system 12 generates a list comprising the selected customers or appends the currently selected customers to a list of any previously selected customers.

In this fashion, the user may append newly identified customers to a list of previously selected customers without re-requesting a list with additional search criteria and re-selecting the previously selected customers. Consequently, the user may more effectively and efficiently manage customer data required to provide airline services.

Figure 7:
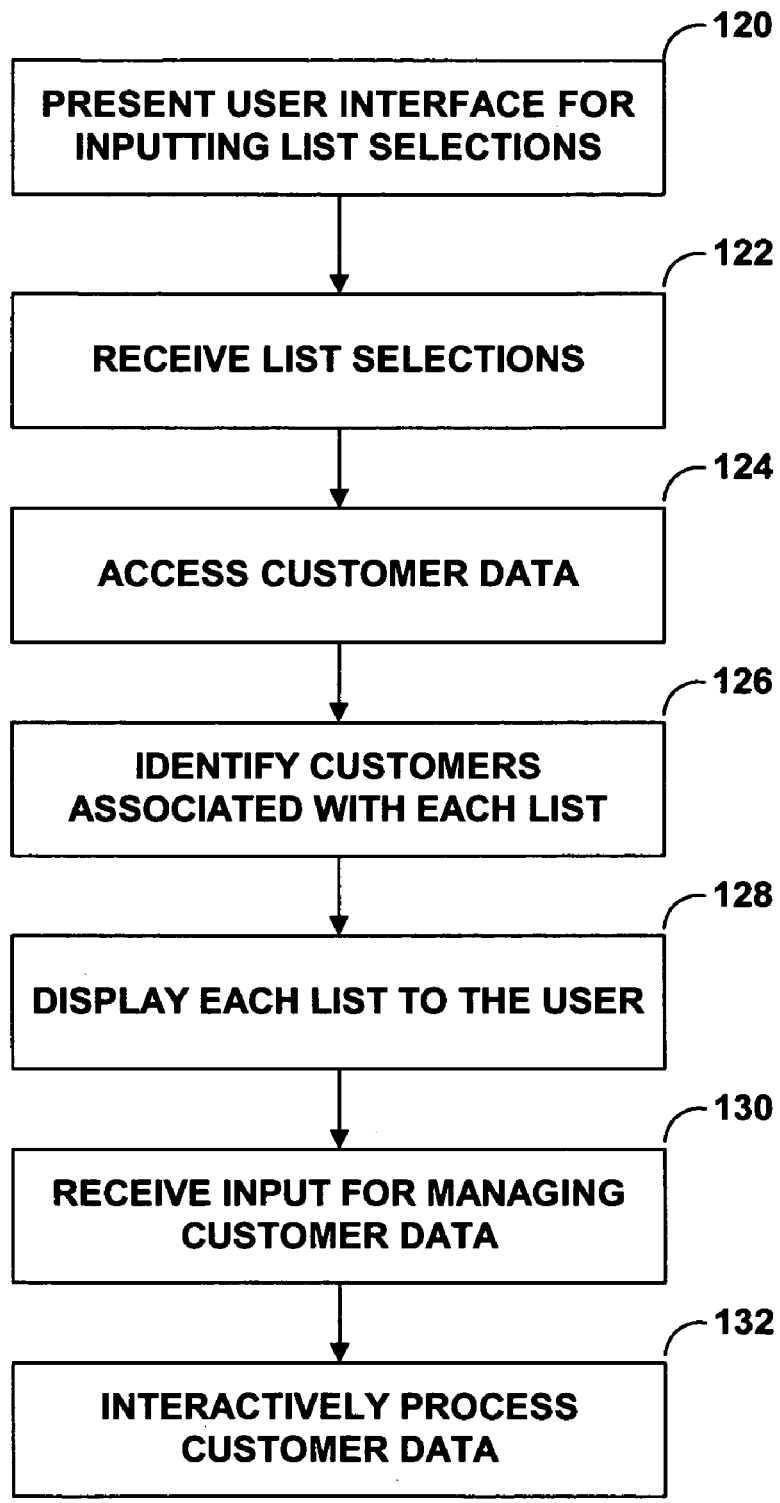
FIG. 7 is a flow diagram illustrating exemplary operation of an airline management system providing network-based management of customer data.

FIG. 7 is a flow diagram illustrating exemplary operation of airline management system 12 providing network-based management of customer data by simultaneously displaying multiple lists and interactively processing customer data corresponding to customers associated with the lists. Initially, a user such as a gate agent or a flight supervisor logs into airline management system 12. The user may, for example, connect to airline management system 12 using a web browser, and input a username and password to log into airline management system 12.

Airline management system 12 presents the user with a user interface for selecting different types of lists of customers to be displayed at the same time (120). The user may be presented with a split-screen user interface capable of displaying two lists of customers on opposing sides of the screen. In other embodiments, the user interface may be configured to display more than two lists of customers at the same time. Each of the different types of lists may comprise customers associated with different criteria. The lists may include a standby list, a grading list, a need notification list, a volunteer list, a passenger available for disembarkation (PAD) list, a not boarded list, an inbound summary list, a registered customers list, or an inbound flight details list. Airline management system 12 receives input from the user identifying the selected lists (122)

Airline management system 12 accesses customer profile data 28A, booking data 28B, or both (124) and identifies the customers associated with each of the selected lists based on the input (126). Airline management system 12 then displays the selected lists to the user on opposing sides of the split-screen user interface (128). Each side of the split-screen user interface may include appropriate fields for receiving input for managing customer data (130). Based on the input, airline management system 12 interactively processes the customer data (132). Interactively processing customer data may comprise updating customer data stored in customer profile data 28A, booking data 28B, or both so that the changes are reflected in all dependent or related lists.

For example, the user may select to simultaneously display a standby list on the left-side of the split-screen user interface and a registered customer list on the right-side of the split-screen user interface. The user may then provide input for placing a customer associated with the registered customer list on standby. Upon receiving the input, airline management system 12 accesses booking data 28B and changes the appropriate customer data to indicate that the customer is on standby and is not currently registered for the flight. Furthermore, airline management system 12 updates the registered customer list to no longer include the customer and also updates the standby list to include the customer. Thus, airline management system 12 may allow a user to more effectively and efficiently manage customer data required to provide airline services, in particular airline services provided at a gate of an airport.

Figure 8:
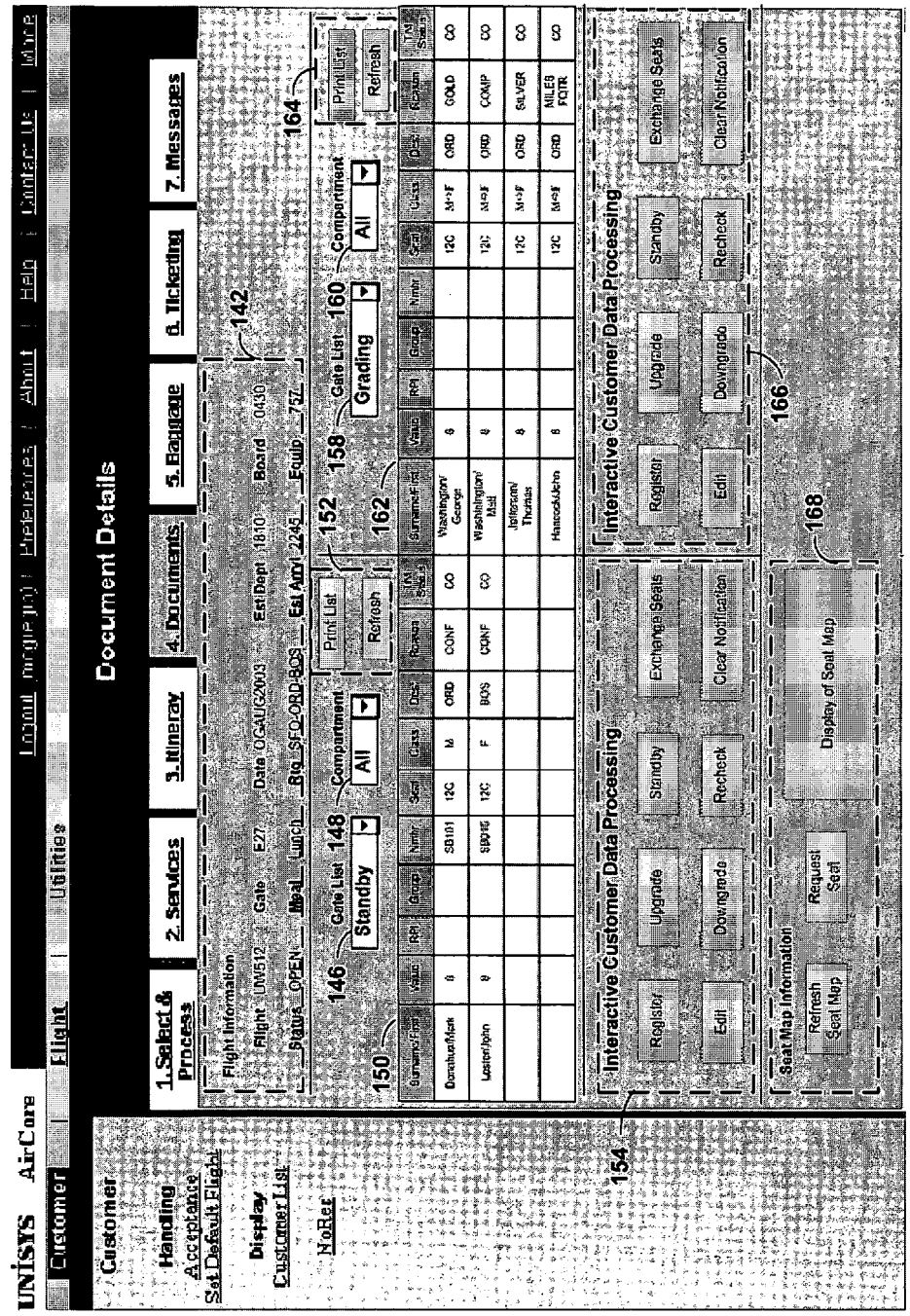
FIG. 8 is a screen illustration of an exemplary user interface for processing customer data corresponding to customers associated with a standby list and a grading list.

FIG. 8 is a screen illustration of an exemplary user interface 140 for interactively processing customer data corresponding to customers associated with multiple lists. In this example, as illustrated in FIG. 8, user interface 140 presents input areas 144, 156 for interactively processing the customer data associated with a standby list and a grading list, respectively, for flight information 142. The user specifies flight information 142 using a previously displayed user interface. Flight information may include the airline, flight number, status, gate, meal information, date, routing, estimated time of departure, estimated time of arrival, flying time, and equipment information. Flight information 142 may also include flight remarks, capacity of aircraft, count of transit customers, count of customers on standby, count of passengers available for disembarkation, and time remaining until departure.

User interface 140 includes pull-down menu 146 for selecting the type of list to be displayed on the left-hand-side, a pull-down menu 148 for selecting a compartment, a list of customers 150 that satisfy pull-down menus 146, 148, an action control area 152, and an interactive customer data processing area 154. Pull-down menu 146 may be used to select the type of list to be displayed. The selection of lists may include a standby list, a grading list, a need notification list, a volunteer list, a passenger available for disembarkation (PAD) list, a not boarded list, an inbound summary list, a registered customers list, or an inbound flight details list.

The user may customize the standby list by selecting a specific compartment using pull-down menu 148. In the illustrated example, user interface 140 displays the list of customers 150 on the standby list for all compartments for the flight corresponding to flight information 142 and the state of input mechanisms 146, 148. Action control area 152 includes a print list button and a refresh button. The user may choose to either send a copy of customer list 150 to a printer by activating the print list button or refresh customer list 150 by activating the refresh button. The user may identify one or more interactive customer data processing actions using interactive customer data processing area 154. For example, the user may register, upgrade, change standby status, exchange seats, downgrade, and re-check a customer for the flight specified in flight information 142 by selecting the appropriate button. The user may also clear notifications and edit customer profile data for a customer. In response to receiving a selection from interactive customer data processing area 154, user interface 140 may display the appropriate change, however, airline management system 12 may not process the customer data until the user activates the refresh button.

User interface 140 also includes pull-down menu 158 for selecting the type of list to be displayed on the right-hand-side, pull-down menu 160 for selecting a compartment, a list of customers 162 that satisfies pull-down menus 158, 160, an action control area 164, and an interactive customer data processing area 166. In the illustrated example, user interface 140 displays the grading list 162 for all compartments for the flight corresponding to flight information 142.

User interface 140 may include seat map information 168 where the user may refresh the seat map, request a seat, or display the seat map.

Figure 9:
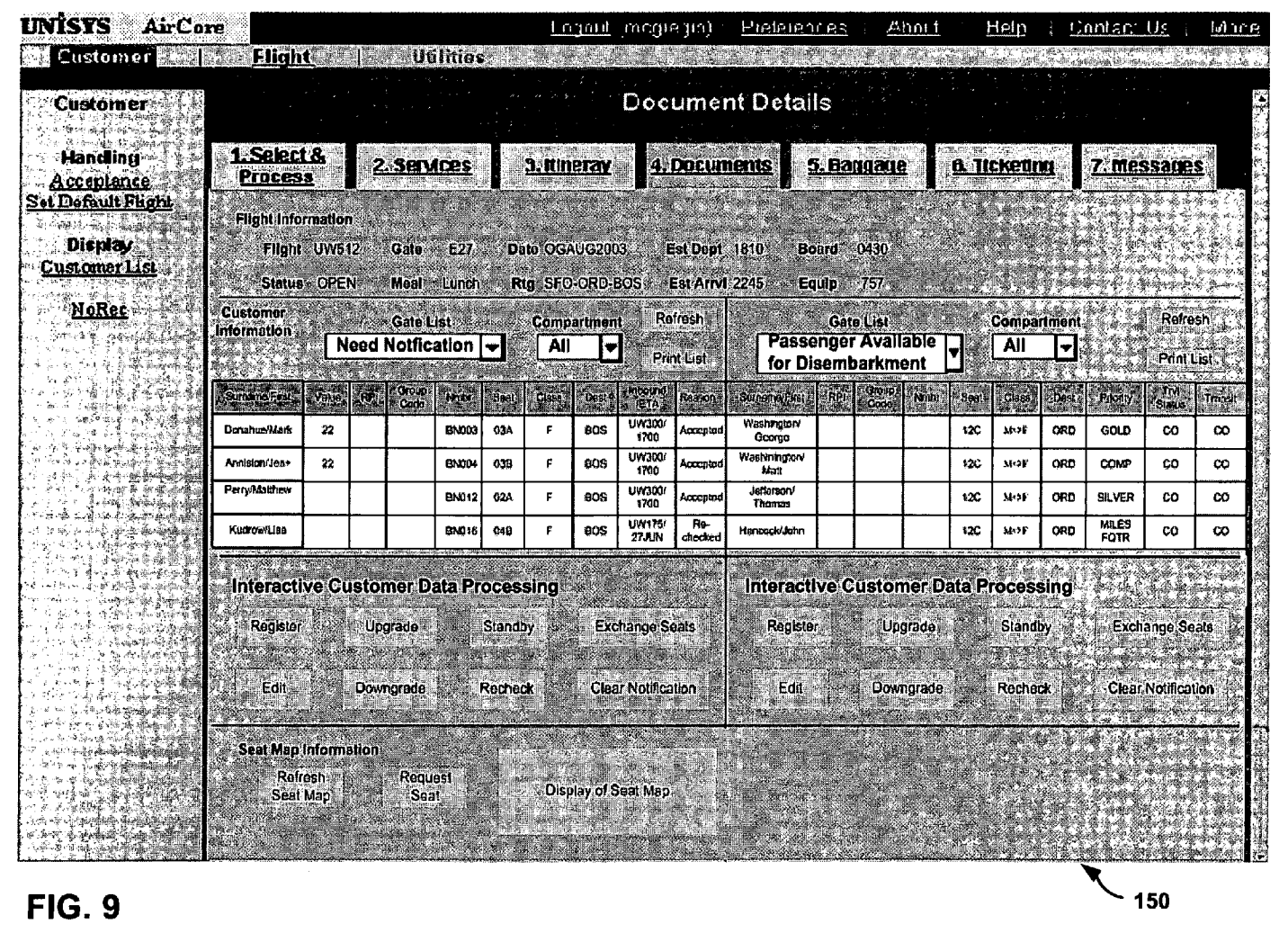

FIG. 9 is a screen illustration of exemplary user interface 150 for processing customer data. In this example, a user may interact with user interface 150 to process customer data corresponding to customers associated with a need notification list and a passenger available for disembarkation (PAD) list.

Figure 10:
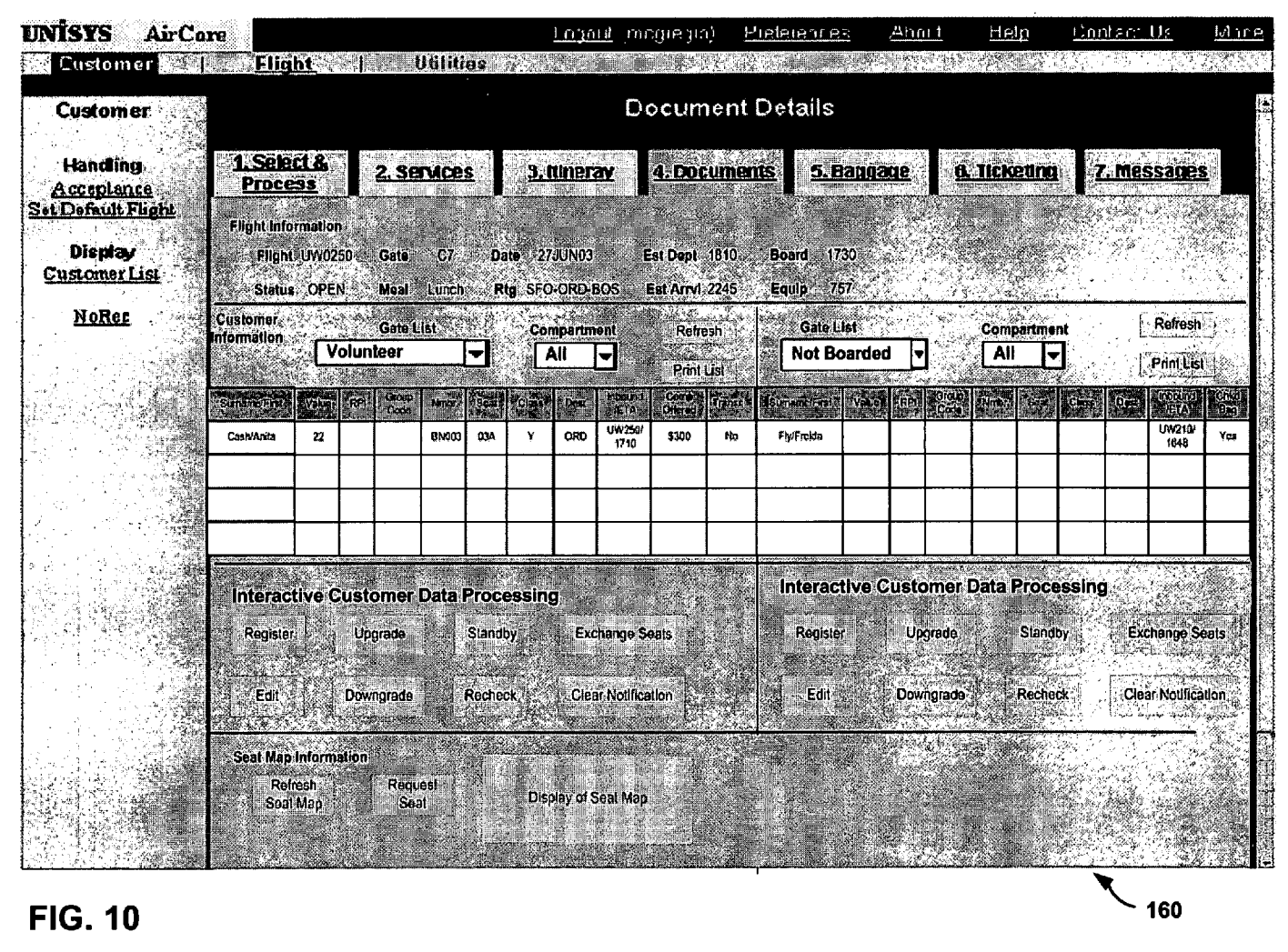

FIG. 10 is a screen illustration of an exemplary user interface 160 for processing customer data. In this example, a user may interact with user interface 160 for processing customer data corresponding to customers associated with a volunteer list and a not boarded list.

Various embodiments of the invention have been described. Although the embodiments are described in terms of an airline for exemplary purposes, the techniques of the invention may be applied to improve the efficiency of managing special service needs in other transportation industries, such as the train industry, bus industry or the like. These and other embodiments are within the scope of the following claims.

The invention claimed is:

1. A computer-implemented method for managing transportation carrier services comprising:
presenting a network user interface to receive a first set of search criteria;
searching a database to identify a first set of one or more customers that satisfy the first set of search criteria;
generating an intermediate list comprising the identified first set of customers;
presenting the network user interface to receive a second set of search criteria different than the first set of search criteria;
searching the database to identify a second set of one or more customers that satisfy the second set of search criteria;
forming a composite list from the first set of customers and the second set of customers; and
displaying the composite list via the network user interface,
wherein presenting the network user interface comprises presenting the network user interface to further display a plurality of interrelated screens including:
a first screen that the user interface initially displays to receive the first set of search criteria and present a first button that when activated indicates formation of the composite list, and
a second screen that the user interface displays in response to a first activation of the first button to display the intermediate list comprising the first set of customers that satisfy the first set of search criteria, receive a selection of one or more of the customers of the intermediate list, present a second button that when activated indicates the search and append action, and present a third button that when activated accepts an airline management action performed on one or more of the customers of the intermediate list,
wherein in response to activation of the second button, the user interface redisplays the first screen to receive the second set of search criteria, and
wherein in response to a second activation of the first button, the user interface redisplays the second customer screen to display the composite list, the composite list comprising the customers selected from the intermediate list and the customers that satisfy the second set of search criteria, present the second button that when activated indicates the search and append action, and present a third button that when activated accepts an airline management action performed on one or more of the customers of the composite list.

2. The method of claim 1, further comprising selecting one or more customers associated with the composite list and performing an airline service for the one or more selected customers.

3. The method of claim 1, further comprising selecting one or more of the customers identified by the composite list and displaying history data for the selected customers.

4. The method of claim 1, further comprising selecting one or more customers associated with the composite list and displaying detailed customer data associated with the one or more selected customers.

5. The method of claim 1, wherein forming a composite list comprises forming the composite list by appending the identified second set of customers to the intermediate list.

6. The method of claim 1, further comprising:
receiving input selecting one or more of the first set of customers from the intermediate list; and
wherein forming the composite list comprises forming the composite list to include the second set of customers and the selected customers of the first set of customers.

7. The method of claim 1, wherein at least one of the customers of the first set of customers is associated with a registration group or a booking group.

8. The method of claim 1, wherein the search criteria specifies at least one of a form of identification associated with a customer, a surname, a first name, a transport carrier, a transport number, a date, a class, an origin, a destination, a boarding number, a seat number, a standby number, a passport number, a frequent traveler number or a confirmation number.

9. The method of claim 1, further comprising:
presenting the network user interface to receive a third set of search criteria different than the first and second set of search criteria;
searching the database to identify a third set of one or more customers that satisfy the third set of search criteria; and
forming a new composite list from the first set of customers that satisfy the first set of search criteria, the second set of customers that satisfy the second set of search criteria, and the third set of customers that satisfy the third set of search criteria; and
displaying the new composite list via the network user interface.

10. The method of claim 1, wherein the transportation carrier services comprise airline services.

11. An airline management system comprising:
a host computer system that stores customer data associated with customers of one or more airlines;
a computer coupled to the host computer system;
a user interface software module operating on the computer to present a user interface for receiving a first set of search criteria and a second set of search criteria different than the first set of search criteria; and
a list management module executing on the host computer system,
wherein the list management module accesses a database in accordance with the first search criteria to form an intermediate list identifying a first set of one or more customers that satisfy the first set of search criteria,
wherein the list management module accesses the database in accordance with a second set of search criteria to form a composite list that includes a second set of one or more customers that satisfy the second set of search criteria and at least a portion of the intermediate list identifying the first set of custom ers,
wherein the user interface displays the composite list,
wherein the user interface software module presents the user interface by further presenting the user interface to display a plurality of interrelated screens including:
a first screen that the user interface initially displays to receive the first set of search criteria and present a first button that when activated indicates formation of the composite list, and
a second screen that the user interface displays in response to a first activation of the first button to display the intermediate list comprising, the first set of customers that satisfy the first set of search criteria, receive a selection of one or more of the customers of the intermediate list, present a second button that when activated indicates the search ad append action, and present a third button that when activated accepts any airline management action performed on one or more of the customers of the intermediate list,
wherein in response to activation of the second button the user interface module redisplays the first screen to receive the second set of search criteria, and
wherein in response to a second activation of the first button, the user interface module redisplays the second customer screen to display the composite list, the composite list comprising the customers selected from the intermediate list and the customers that satisfy the second set of search criteria, present the second button that when activated indicates the search and append action, and present a third button that when activated accepts an airline management action performed on one or more of the customers of the composite list.

12. The system of claim 11,
wherein the user interface receives a third set of search criteria different than the first and second set of search criteria,
wherein the customer list management module accesses the database to identify a third set of one or more customers that satisfy the third set of search criteria, and forms a new composite list from the first set of customers, the second set of customers and the third set of customers, and
wherein the user interface displays the new composite list.

13. A computer-implemented method for managing transportation carrier services comprising:
presenting a network user interface for receiving input from a user, wherein the input specifies two or more different search criteria;
searching a database to identify one or more customers having customer data that satisfies any of the different search criteria;
generating a plurality of customer lists, wherein each of the customer lists corresponds to different search criteria and includes customer data for the customers that satisfy the respective search criteria; and
displaying each list simultaneously via the network user interface.

14. The method of claim 13, wherein transportation carrier services comprise airline services.

15. The method of claim 14, further comprising:
modifying the customer data corresponding to one or more customers that are associated with a first one of the lists;
automatically updating the other lists to reflect the updated customer data; and
redisplaying the updated lists.

16. The method of claim 14, wherein the customer data includes at least one of a surname, a first name, a customer value, a registration party identifier, a booking code, a standby number, a boarding number, an assigned seat number, a booking class, a destination airport, a standby reason, a travel status, an inbound flight identification code, an estimated time of arrival, a notification reason, a priority indicator, a priority number, a transit indicator, compensation offered data or a checked baggage indicator.

17. The method of claim 14, wherein the search criteria specifies customer data associated with a specific set of flight data.

18. The method of claim 14, wherein the search criteria specifies at least two of standby data, grading data, need notification data, passenger available for disembarkation data, volunteer data, not boarded data, inbound flight details data, registered customers data, inbound flight summary data, compensated customer data, released seat data, transferred seat data, and volunteer data.

19. The method of claim 14, wherein the search criteria specifies standby data and grading data for a specific set of flight data, and displaying each list comprises displaying a list comprising the standby data corresponding to the identified customers and a list comprising the grading data corresponding to the identified customers.

20. The method of claim 14, wherein the search criteria specifies need notification data and passenger available for disembarkation data for a specific set of flight data, and displaying each list comprises displaying a list comprising the need notification data corresponding to the identified customers and a list comprising the passenger available for disembarkation data corresponding to the identified customers.

21. The method of claim 14, wherein the search criteria specifies volunteer data and not boarded data for a specific set of flight data, and displaying each list comprises displaying a list comprising the volunteer data corresponding to the identified customers and a list comprising the not boarded data corresponding to the identified customers.

22. The method of claim 14, wherein the search criteria specifies inbound flight details data and registered customers data for a specific set of flight data, and displaying each list comprises displaying a list comprising the inbound flight details data corresponding to the identified customers and a list comprising the registered customers data corresponding to the identified customers.

23. The method of claim 14, wherein the search criteria specifies inbound flight summary data and registered customers data for a specific set of flight data, and displaying each list comprises displaying a list comprising the inbound flight summary data corresponding to the identified customers and a list comprising the registered customers data corresponding to the identified customers.

24. The method of claim 14, wherein the search criteria specifies inbound flight details data and standby data for a specific set of flight data, and displaying each list comprises displaying a list comprising the inbound flight details data corresponding to the identified customers and a list comprising the standby data corresponding to the identified customers.

25. The method of claim 14, wherein the search criteria specifics inbound flight details data and registered customers data for a specific set of flight data, and displaying each list comprises displaying a list comprising the inbound flight details data corresponding to the identified customers and a list comprising the registered customers data corresponding to the identified customers.

26. The method of claim 13, wherein the user interface is a split-screen user interface such that two lists are displayed simultaneously.

27. The method of claim 1, wherein the second set of customers includes at least one customer not included in the identified first set of customers.

28. The airline management system of claim 11, wherein the second set of customers includes at least one customer not included in the identified first set of customers.

29. The method of claim 13, wherein each of the customer lists includes at least one customer not included in the other customer lists.

\* \* \* \* \*